T. A. HILL.
GATE.
APPLICATION FILED OCT. 21, 1912.

1,099,747.

Patented June 9, 1914.
3 SHEETS—SHEET 2.

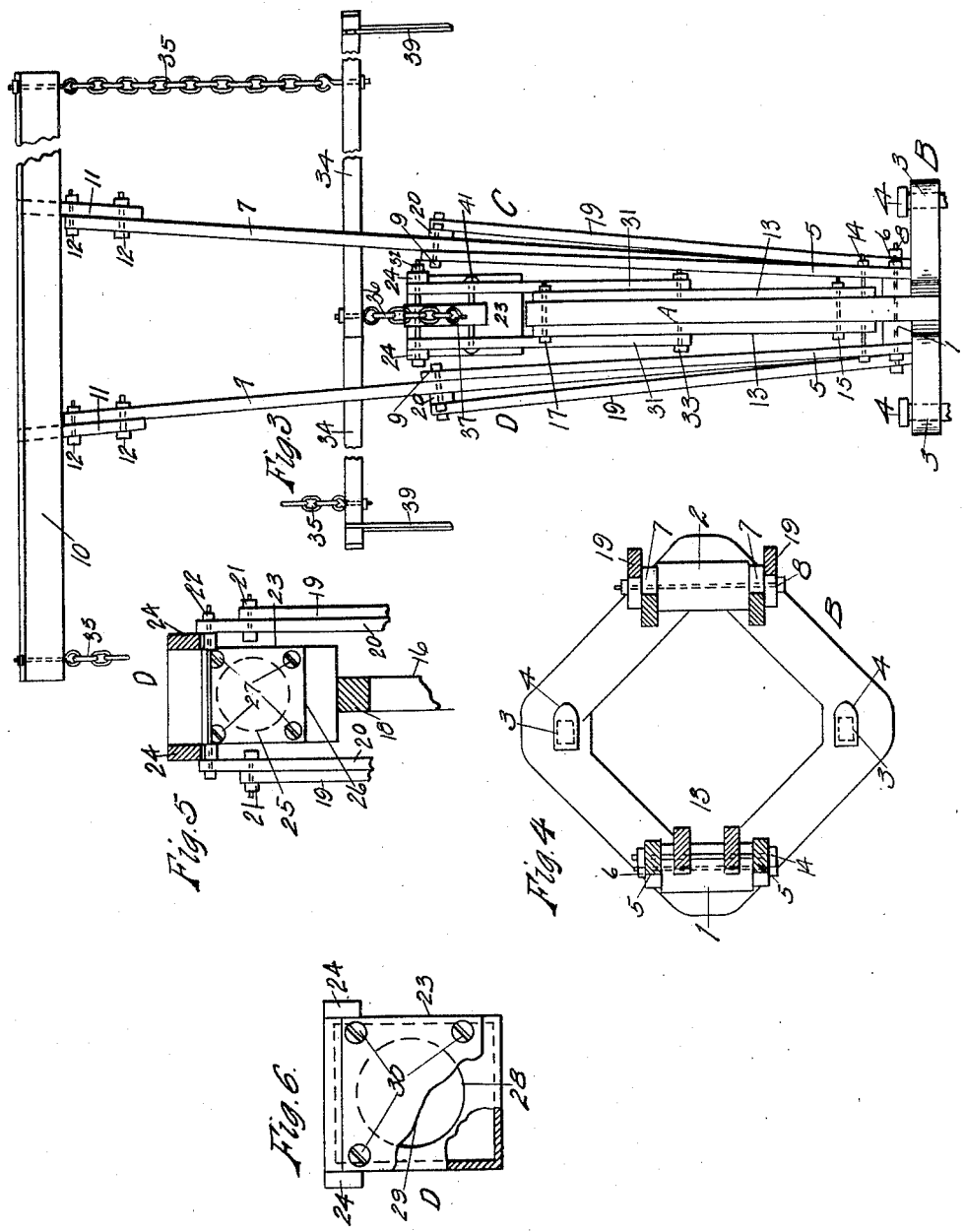

UNITED STATES PATENT OFFICE.

TERELIUS A. HILL, OF MARYVILLE, TENNESSEE.

GATE.

1,099,747.  Specification of Letters Patent.  Patented June 9, 1914.

Application filed October 21, 1912. Serial No. 727,004.

*To all whom it may concern:*

Be it known that I, TERELIUS A. HILL, a citizen of the United States, residing at Maryville, in the county of Blount and State of Tennessee, have invented a new and useful Improvement in Gates, of which the following is a specification, reference being had to the accompanying drawing.

My improvement relates particularly to gates which extend across a roadway or passageway and are hinged on an axis which is horizontal and perpendicular to the plane of the gate, so that the gate will turn in its own upright plane.

The improvement comprises mechanism for supporting the gate body and shifting it from the horizontal into the upright position and vice versa.

The object of the invention is to provide a minimum of simple mechanism for thus effectively supporting and moving the gate body.

Figure 1:
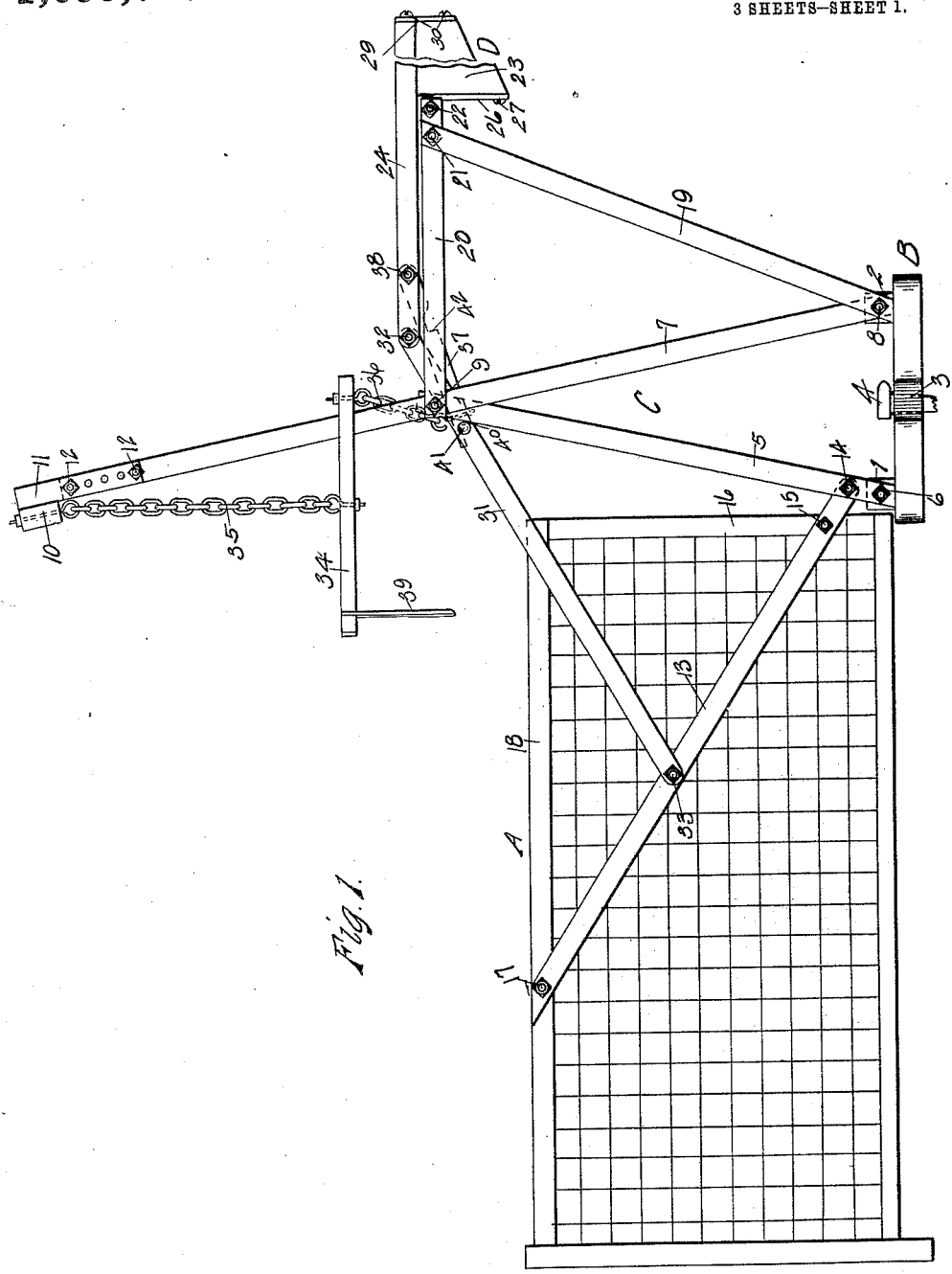
Figure 2:
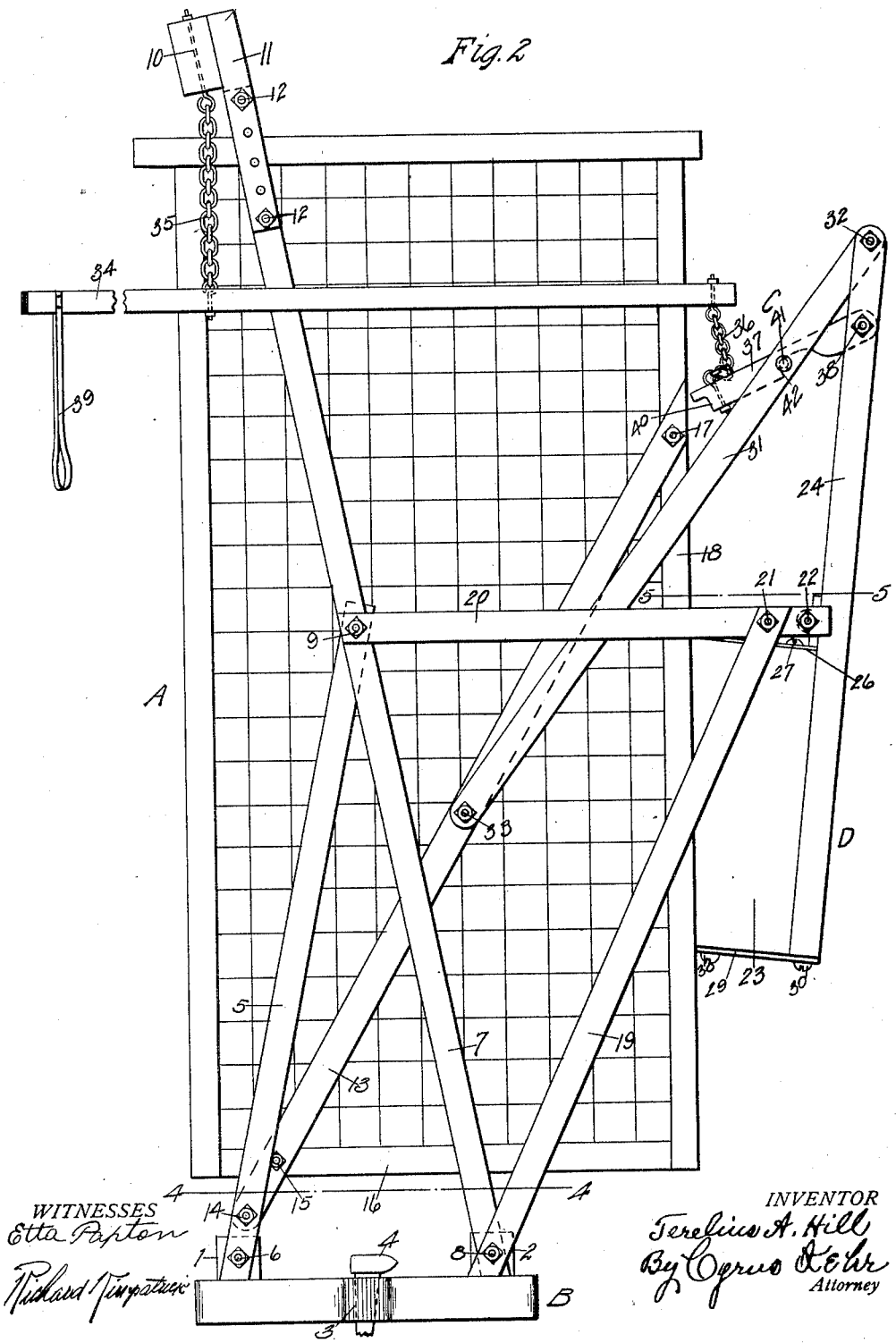

In the accompanying drawings, Figure 1 is an elevation showing my improved apparatus, the gate being in the horizontal or closed position; Fig. 2 is a similar, but larger elevation, the gate being in the upright or open position; Fig. 3 is an elevation of the apparatus looking toward the right in Fig. 1; Fig. 4 is a section on the line, 4—4, of Fig. 2; Fig. 5 is a section on the line, 5—5, of Fig. 2; Fig. 6 is a detail view of the lower or outer end of the counter weight box.

Referring to said drawings, A is the gate body; B is a base; and C is a frame supported on the base.

The base may be formed of any desired material, preferably concrete. At the front of the base is a short post, 1. At the rear of the base is a similar post, 2. To these two posts is secured the frame, C, and said frame supports the gate and all the operating parts. The various parts are so arranged as to form a structure having a center of gravity which is approximately over the center of said base, so that the latter may rest flatwise upon the ground only moderate or no means for holding the base at rest upon the ground being used. In the drawings, the base is provided with two slots, 3, and a stake, 4, extending downward through each such slot into the ground.

Two short frame pieces, 5, have their lower ends placed at opposite sides of the forward post, 1, and secured to said post by a bolt, 6, extending horizontally through said pieces and said post. Two longer frame pieces, 7, have their lower ends resting against opposite sides of the rear post, 2, and secured to said post by a horizontal bolt, 8, extending through said pieces and said post. The upper end of each frame piece, 5, overlaps the corresponding and longer frame piece, 7, and is secured to the latter by a horizontal bolt, 9. A horizontal bar, 10, joins the upper ends of the frame pieces, 7, 7, said bar being secured immovably to said frame pieces in any suitable manner. The drawings show adjusting pieces, 11, overlapping the upper ends of the pieces, 7, and immovably secured to the latter by bolts, 12, the bar, 10, being secured by nailing or otherwise, to the adjusting pieces. By placing these adjusting pieces between the frame pieces, 7, 7, and the bar, 10, the height of said bar may be varied without varying the length of the frame, 7. These adjusting pieces, 11, may be regarded as being parts of the frame pieces, 7. The shorter frame pieces, 5, 5, and the longer frame pieces, 7, 7, and the horizontal bar, 10, constitute an immovable frame which supports the working parts of the apparatus.

The gate body, A, is of the usual rectangular form and of greater length than height. The inner or rear end of the gate is hinged to the short frame pieces, 5, 5, on an axis which is horizontal and perpendicular to the plane of the gate. For this purpose, two oblique hinge pieces, 13, have their rear ends hinged to the frame pieces, 5, 5, by means of bolts, 14, and extend thence obliquely outward and upward along opposite sides of the gate body and are secured to the latter by a bolt, 15, extending through said pieces and the end plate or member, 16, of the gate and by a bolt, 17, extending through said hinge pieces and the top plate or back, 18, of the gate body. The bolt, 15, is placed through the lower portion of the end plate, 16, in order that the hinge of the gate body may be low enough to put the center of gravity rearward of the hinge when the gate body is raised into the upright position, as shown in Fig. 2, so that when in that position, the gate will tend to turn farther rearward. Such rearward movement is limited by the counter weight, D, as will be next described.

From the rear post, 2, rise two braces, 19, the lower end of one such brace being applied to the outer side of the lower end of each frame piece, 7, and the bolt, 8, extending through said braces as well as through said frame pieces. An arm, 20, is placed between the upper end of each brace, 19, and the middle portion of the adjacent frame piece, 7, the bolts, 9, going through the rear ends of said arms, 20, as well as through said brace pieces. The rear end of each such arm and the upper end of the adjacent brace, 19, overlap and are penetrated by a bolt, 21, which extends through the other brace, 19, and arm, 20.

The counter-weight, D, extends between the rear ends of the arms, 20, and is hinged to said arms by a bolt, 22, extending horizontally through the arms and the counter-weight. The counter-weight comprises a box, 23, and two arms 24, the latter being forward and upward and the former rearward and downward of the bolt, 22. For convenience in description, the portion of the box adjacent the hinge is called the inner end, while the opposite end of said box is called the outer end.

When the gate body is in the horizontal or in the upright position, the counter-weight is in the corresponding position. The box is filled to any desired extent with earth, sand, gravel, stone, or any other suitable heavy material, so that the box tends to turn downward into the approximately upright position shown in Fig. 2. The forward face of the box when in such upright position is adapted to bear against the then upright rear edge (the back) of the gate.

In the upright or forward end of the box is a port, 25, on which is a lid, 26, secured by screws, 27, and at the lower or outer end of the box is a port, 28, having a similar lid, 29, secured by screws, 30. The port, 25, is for the introduction of material to make the desired weight, and the port, 28, is for the withdrawal of such material.

The end of each counter-weight arm, 24, which is the farther from the box is coupled to the gate body by means of a link, 31, one end of each such link being coupled to its counter weight arm by means of a bolt, 32, extending horizontally through said links and said arms, and the other end of each of said links being coupled to the hinge pieces, 13, by means of a bolt, 33, extending horizontally through said links and said hinge pieces. This is a convenient way of joining the links, 31, to the gate body when the middle portion of the latter is composed of open fabric as shown in the drawings.

The relative arrangement and dimensions of the parts are such as to bring the counter-weight into the horizontal position when the gate body is in the horizontal position, as shown in Fig. 1, and so as to bring the counter-weight into the approximately upright position when the gate body is in the upright position, as shown in Fig. 2. It will be seen that when the counter-weight and the gate body are thus hinged and coupled to each other, the counter-weight box will tend to turn downward and thereby move the arms, 24, links, 31, and gate body, A, upward. The material which is put into the counter-weight box is to be of sufficient weight to cause the easy movement of the gate body into and out of the upright and horizontal positions.

In assembling the parts, the frame pieces, 5 and 7, and the bar, 10, are set up. Then the gate body is hinged to the frame pieces, 5, and turned into the upright position and blocked to so remain. Then the braces, 19, and arms, 20, are applied. Next the counter-weight is hinged in such position on the arm, 20, as to bring the forward face of the box flatwise against the then rear rail or edge of the gate body, and temporarily secured in such position. Then the links, 31, are applied to the arms, 24, and the hinge pieces, 13. Now the means for temporarily securing the counter-weight and the means for blocking the gate body may be removed. Thus the gate is ready for operation manually by a person standing close to the gate body. But I show means whereby the gate body may be operated by a person seated in a vehicle or on a horse near the gate. For this purpose, arms, 34, are suspended from the ends of the bar, 10, by means of chains, 35, the upper ends of said chains being secured to the ends of said bar and the lower ends of said chains being secured to said bars between the ends of the latter. Said arms, 34, are placed approximately parallel to the bar, 10, and meet each other endwise, and the meeting ends are coupled to each other and to a chain, 36, which is also coupled to the counter-weight in any desired manner. The drawings show this done through a latch piece, 37, which lies between the upper ends of the links, 31, and the counter weight arms, 24, and is hinged to said arms, 24, by means of a bolt, 38, extending horizontally through said arms and said latch piece. To the outer end of each suspended arm, 34, is applied a pendant hand piece, 39, to be pulled by a person on a vehicle or horse.

The forward portion of the latch-piece, 37, will move downward when free to do so. Near its front end said latch-piece has a forward-directed shoulder, 40, adapted to bear against a bolt, 41, when the gate body is in the horizontal or closed position and the chain, 36, is slack, the inner or coupled ends of the suspended arms, 34, plus the chain, 36, being made heavier than the outer ends of the suspended arms and said chain may, normally, descend to allow the forward end of the latch-piece to descend and rest upon the bolt, 41. When the latch-piece is in this position, the gate body is held against upward movement, for the latch piece forms a strut which prevents the links, 31, and the arms, 24, from folding toward each other. Between the shoulder, 40, and the bolt, 37, the lower portion of the latch-piece is provided with a rearward directed shoulder, 42, which bears against the bolt, 41, when the gate is in the upright position the latch-piece falling by gravity to permit such engagement. When the gate body is to be shifted from either the open or the closed position, the upward movement of the chain 36, first lifts the latch-piece out of engagement with the bolt, 41 and then draws on the counter-weight arms through the latch-piece. On lifting the latch piece when the gate is in the horizontal position, the upper edge of the latch piece bears against the bolt, 32.

For moving the gate body out of the horizontal position, either hand piece is pulled downward and toward the plane of the gate body. By this means, the chain, 36, is carried upward. This first draws the latch piece, 37, upward for its release, and then draws the links, 31, upward and rearward, whereby the gate body and the counter-weight are turned into their upright positions. This involves a rearward movement of the attachment of the lower end of the chain, 36, whereby the meeting ends of the arms, 34, are turned rearward while the free ends of said arms are turned correspondingly forward, such turning being on the chains, 35. Said chains must also oscillate to allow the rearward and forward movement of the meeting ends of the arms, 34. To turn the gate body downward, one of the hand pieces is pulled downward and from the plane of the gate body, whereby the coupled ends of the suspended arms are moved upward and forward for first releasing the latch-piece and then drawing the counter-weight arms, 24, and the links, 31, forward.

By providing engagement between the back of the gate body and the counter-weight box when the counter-weight box assumes the upright position, the gate body and said box act as buffers for each other, and the shock due to the striking of said two members is absorbed without undue strain on the hinges of said parts or on the frame, the action being similar to the striking of two pendulums against each other.

The movement of the suspended arms, 34, is principally endwise, the movement for raising the gate body being chiefly toward the plane of said body, and the movement for returning the gate body from the upright position being away from said plane, so that for both the raising and the lowering of the gate body, the hand piece, 39, is to be engaged and drawn substantially parallel to the direction in which the person operating the gate is traveling. But there is also a turning of the arms, 34, as above stated. The parts are preferably so arranged and proportioned as to bring the chains, 35, substantially into the upright position when the gate body is midway between its upright and its horizontal positions.

My improvement is applicable to new gates and also to gates already made. For the latter purpose, the parts, other than the gate body, are to be made in any desired numbers and sets thereof taken from the stock thus provided. When this course is taken, provision should be made for varying the application of the parts to each other to conform to variations in the dimensions of the gate body. The hinge pieces, 13, the links, 31, and other parts may have extra holes to provide for such adjustment; and the upper ends of the frame pieces, 7, or the adjusting pieces, 11 may have extra holes to permit varying the elevation of said adjusting pieces.

At the position occupied by the outer end of the gate body when the latter is in the horizontal position, any desired or well-known device may be used to prevent that end of the gate body from moving sidewise. For this purpose, a post bearing two parts or members adapted to stand at each side of the gate body may be used. Since such mechanism does not come within the scope of this invention, I deem it unnecessary to illustrate and fully describe the same.

The gate body is of such weight as to overcome the counter-weight when the gate body approaches the horizontal position. When the gate body approaches the upright position, its center of gravity passes rearward of its hinge, so that there is positive movement of the gate body into its upright position. Thus the gate body "passes over the center" when moving from the horizontal into the upright position, and vice versa.

The suspended arms, 34, chains, 35, and 36, may be omitted and the gate body moved by direct engagement with the hands. When that is done, the latch-piece, 37, may be modified or omitted or some other latch mechanism applied. But in this connection it is to be observed that my improvement is operative without latch mechanism. Since the gate body "passes over a center", as above described, it will be seen that the gate has no tendency to move out of either its horizontal or its upright position. But sometimes live stock will make an effort to raise such a gate and sometimes a wind storm blowing toward the rear of the gate will tend to move the gate out of the upright position. The space within and around the base, B, may be banked with earth or similar material to give the base greater stability. The arms, 24, of the counter-weight constitute an extension above the counter-weight hinge. No part of the apparatus extends rearward of the path of the counter-weight. Hence the apparatus may be set close to a wall, bank, tree, or other object.

I claim as my invention:

1. The combination with a supporting structure, of a gate body hinged to said supporting structure on a horizontal axis, a counter-weight hinged on said structure to move in a path rearward of and meeting the path of the gate body, in order that the counter-weight and the gate-body may bear against each other when the gate-body is in its upright position, and means coupling said counter-weight to the gate body to cause movement of the counter-weight from its lower position when the gate body moves into its horizontal position and to move into its lower position when the gate body moves into its upright position, substantially as described.

2. The combination with a supporting structure, of a gate body hinged to said supporting structure for turning in an upright plane, a counter-weight hinged on said supporting structure to bear against the back of the gate body when the latter is in the upright position, and a link connection joining said counter-weight and the gate body to cause movement of the counter-weight from its lower position when the gate body moves into its horizontal position and to move into its lower position when the gate body moves into its upright position, substantially as described.

3. The combination with a supporting structure, of a gate body hinged to said supporting structure, and a shiftable counter-weight arranged and coupled to the gate body to bear against the gate body when the latter is in its upright position and the counter-weight is in its lower position, substantially as described.

4. The combination with a supporting structure, of a gate body hinged for turning in an upright plane, a counter-weight hinged on said supporting structure to move in a path rearward of and meeting the path of the gate-body, in order that the counter-weight and the gate-body may bear against each other when the gate body is in its upright position and having an extension above its hinge, and links coupled to said extension and to the gate body to cause movement of the counter-weight from its lower position when the gate body moves into its horizontal position and to move into its lower position when the gate body moves into the upright position, substantially as described.

5. The combination with a supporting structure, of a gate body, hinge pieces applied to said body and hinged to said frame on a horizontal axis, and a counter-weight hinged on said frame to move in a path rearward of and meeting the path of the gate-body, in order that the counter-weight and the gate-body may bear against each other when the gate body is in its upright position, links coupled to said counter-weight and to the gate body to cause movement of the counter-weight from its lower position when the gate body moves into its horizontal position and to move into its lower position when the gate body moves into its upright position, substantially as described.

6. The combination with a supporting structure, of a gate body hinged to said supporting structure on a horizontal axis, a counter-weight hinged on said supporting structure to move in a path rearward of and meeting the path of the gate body, in order that the counter-weight and the gate body may bear against each other when the gate body is in its upright position and comprising a box, and links coupled to said counter-weight and to the gate body to cause movement of the counter-weight from its lower position when the gate body moves into its horizontal position and to move into its lower position when the gate body moves into its upright position, substantially as described.

7. The combination with a supporting structure, of a gate body hinged to said supporting structure on a horizontal axis, a counter-weight hinged on said supporting structure to move in a path rearward of and meeting the path of the gate body, in order that the counter-weight and the gate body may bear against each other when the gate body is in its upright position and comprising a box having an upper port and a lower port, and links coupled to said counter-weight and to the gate body to cause movement of the counter-weight from its lower position when the gate body moves into its horizontal position and to move into its lower position when the gate body moves into its upright position, substantially as described.

8. The combination with a supporting structure, of a base, a gate body hinged to said supporting structure on a horizontal axis, a shiftable counter-weight located on said structure and having its path rearward of and meeting the path of the gate body in order that the counter-weight and the gate body may bear against each other when the gate body is in its upright position, means joining said counter-weight to the gate body to cause movement of the counter-weight from its lower position when the gate body moves into its horizontal position and to move into its lower position when the gate body moves into its upright position, and a latch member in operative relation with the counter-weight, substantially as described.

9. The combination with a supporting structure, of a gate body hinged to said supporting structure on a horizontal axis, a counter-weight hinged on said structure, links coupled to said counter-weight and to the gate body to cause movement of the counter-weight from its lower position when the gate body moves into its horizontal position and to move into its lower position when the gate body moves into its upright position, and a latch member in operative relation with and intervening between said counter-weight and said links, substantially as described.

10. The combination with a supporting structure, of a gate body hinged to said supporting structure on a horizontal axis, a counter-weight hinged on said structure, means coupling said counter-weight to the gate body to cause movement of the counter-weight from its lower position when the gate body moves into its horizontal position and to move into its lower position when the gate body moves into its upright position, a latch in operative relation with said counter-weight and said gate body, and an arm coupled to said latch, substantially as described.

11. The combination with a supporting structure, of a gate body hinged to said supporting structure, a shiftable counter-weight coupled to the gate body to bear against the gate body when the latter is in its upright position and the counter-weight is in its lower position, a latch member, and an arm coupled to said latch member, substantially as described.

In testimony whereof I have signed my name, in presence of two witnesses, this 4th day of October, in the year one thousand nine hundred and twelve.

TERELIUS A. HILL.

Witnesses:
M. H. GAMBLE,
MAUDE O'CONNOR.